United States Patent
Taru et al.

(10) Patent No.: US 6,735,983 B1
(45) Date of Patent: May 18, 2004

(54) OPTICAL FIBER DRAWING METHOD AND DRAWING FURNACE

(75) Inventors: Toshiki Taru, Yokohama (JP); Ichiro Tsuchiya, Yokohama (JP); Katsuyuki Tsuneishi, Yokohama (JP); Katsuya Nagayama, Yokohama (JP); Kazuya Kuwahara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/830,939

(22) PCT Filed: Oct. 29, 1999

(86) PCT No.: PCT/JP99/06039

§ 371 (c)(1),
(2), (4) Date: May 3, 2001

(87) PCT Pub. No.: WO00/29342

PCT Pub. Date: May 25, 2000

(30) Foreign Application Priority Data

Nov. 13, 1998 (JP) .......................................... P10-324181

(51) Int. Cl.⁷ .............................................. C03B 37/02
(52) U.S. Cl. ............................. 65/377; 65/374; 65/484; 65/488; 65/435; 65/537
(58) Field of Search .......................... 65/434, 384, 377, 65/484, 488, 435, 537

(56) References Cited

U.S. PATENT DOCUMENTS 5,250,099 A * 10/1993 Kubo et al. .................... 65/102

FOREIGN PATENT DOCUMENTS

| DE | 3731345 | | 3/1989 | |
|----|---------|---|--------|---|
| EP | 1 069 086 | | 1/2001 | |
| JP | 63-98350 | | 6/1988 | |
| JP | 1-119541 | | 5/1989 | |
| JP | 5-147969 | | 6/1993 | |
| JP | 5-147970 | | 6/1993 | |
| JP | 6199536 | * | 7/1994 | .................. 65/434 |
| JP | 9-2832 | | 1/1997 | |
| JP | 10-130032 | | 5/1998 | |
| WO | WO9951534 | * | 10/1999 | |

OTHER PUBLICATIONS

Abstract of JP 6199536 7/94.*

* cited by examiner

Primary Examiner—John Hoffmann
(74) Attorney, Agent, or Firm—McDermott, Will & Emery

(57) ABSTRACT

A fiber drawing method according to the present invention is a drawing method of optical fiber for drawing an optical fiber 14 from one end of a fiber preform 13 by softening with heat, wherein the fiber preform 13 is set in a semi-closed space 10, 20 opening in part at a lower end in a fiber drawing furnace, the fiber preform 13 is heated by a heater 15 disposed on the lower end side of this semi-closed space 10, 20, and fiber drawing is carried out with adjusting a quantity of heat dissipation from the upper portion 20 of this semi-closed space.

7 Claims, 9 Drawing Sheets

OPTICAL FIBER DRAWING METHOD AND DRAWING FURNACE

TECHNICAL FIELD

The present invention relates to a fiber drawing method of optical fiber capable of suppressing diameter fluctuations and to optical fiber drawing furnaces used of in this method.

BACKGROUND ART

Optical fibers are normally fabricated by softening with heat and drawing from an optical fiber preform shaped like a rod in the optical fiber drawing furnace. In order to reduce the production cost of optical fibers, it is effective to increase the length of the preform and thereby decrease the number of replacement works thereof. At the present time it is possible to make an optical fiber of the total length several hundred kilometers by single optical fiber drawing.

The drawing furnaces have also been improved in order to implement stable drawing of such an elongated fiber preform. The drawing furnace disclosed in Japanese Patent Application Laid-Open No. H09-2832 (which will be called hereinafter a prior art) is an example of such drawing furnaces for drawing of the elongated fiber preform. This drawing furnace is constructed in such structure that a preform container cylinder is coupled to an upper portion of a furnace core tube provided with a heater surrounding it. Then the fiber preform is set in the preform container and the lower end thereof is guided into the furnace core tube. On the other hand, an inert gas such as helium or nitrogen is supplied from the upper end of the preform container. This keeps the furnace core tube and a semi-closed space above it (which will be referred to hereinafter simply as a semi-closed space) in a non-oxidizing atmosphere and the fiber preform is heated to soften from the lower end by the heater, followed by drawing.

During the drawing operation of optical fiber, the fiber preform becomes shorter and shorter with progress of fiber drawing. In the case of the drawing furnace with the preform container coupled, which is disclosed in this prior art, as the fiber preform becomes smaller with progress of fiber drawing, the space gradually becomes wider between the preform container and the fiber preform. It makes the inert gas in this space easier to flow and also increases a temperature difference between the inert gas in this space and the inert gas present between the furnace core tube and the fiber preform under drawing, so as to cause convection of the inert gas in the semi-closed space.

Occurrence of such convection leads to instable flow of the atmosphere near the lower end of the fiber preform in the softened state with heat, i.e., near the outside of the opening end of the semi-closed space. It can affect the optical fiber under drawing so as to make the diameter fluctuations of optical fiber considerably large, thus making it difficult to obtain products with desired quality.

As countermeasures against it, the prior art discloses the technology of disposing an annular auxiliary heater around the upper end of the preform container and heating and retaining the inside of the upper end of the preform container at several hundred degrees. It is described that this technology can prevent occurrence of the convection in the semi-closed space and thus permit the optical fiber to be drawn in steady diameter.

DISCLOSURE OF THE INVENTION

With the drawing furnace as above described, further increase in the length of the fiber preform will result in also extending the preform container housing it. It also increases the volume of the semi-closed space. It is obvious that the heating region by the auxiliary heater also has to be elongated in order to prevent the unwanted convection in the semi-closed space.

The fiber preform of this kind is supported so as to be suspended from a support rod having the diameter smaller than the outside diameter of the preform in the preform container. The preform has a shoulder gradually decreasing its diameter toward the end, near a joint with the support rod. When the fiber preform is heated for drawing, this shoulder radiates a large quantity of heat, which also heats up the preform container facing it. With the elongation of the fiber preform accompanied by the expansion of the heating region inside the preform container, there is a possibility of overheating the internal wall of the preform container and eventually melting it. The shoulder of the fiber preform can also soften by the overheat, whereby the fiber preform undergoes axial extension in the shoulder part because of the weight of the fiber preform itself, so as to raise a possibility of failure in normal drawing of optical fiber.

In view of the above problem, an object of the present invention is to provide an optical fiber drawing method and an optical fiber drawing furnace capable of surely producing the optical fiber in steady diameter even in cases using the elongated fiber preform.

In order to accomplish the above object, an optical fiber drawing method according to the present invention is a drawing method of optical fiber comprising steps of setting an optical fiber preform in a furnace core tube and a preform container connected to an upper portion of the furnace core tube and drawing an optical fiber from one end of the preform by softening with heat, wherein an upper portion of the preform container is provided with an auxiliary heater and cooling means for cooling the upper portion of the preform container, and the drawing step includes adjusting a cooling quantity by said cooling means.

Namely, a drawing furnace used in this drawing method is a fiber drawing furnace comprising a furnace core tube through which an optical fiber preform penetrates vertically, a heater disposed around this furnace core tube and a preform container connected to an upper portion of the furnace core tube so as to be integral with the furnace core tube to form a semi-closed space opening in part at a lower end, for housing the fiber preform inside, the fiber drawing furnace further comprises an auxiliary heater disposed at an upper portion of the preform container and cooling means for cooling the upper portion of the preform container.

The present invention permits the temperature difference to be reduced in the space of clearance to the fiber preform in the semi-closed space formed by the furnace core tube and the preform container, so as to suppress occurrence of convection described above, even in the case of the elongated fiber preform. Further, cooling the upper portion of the preform container prevents the overheat of the internal wall of the preform container and, in turn, prevents the overheat of the shoulder of the fiber preform, which permits the optical fiber to be surely drawn in steady diameter and which prevents breakage of the drawing furnace.

Here the drawing furnace is preferably one further comprising at least one temperature sensor for measuring an internal temperature of the upper portion of the preform container and adjusting the cooling quantity based on the temperature measured by the temperature sensor.

It is preferable to employ either of the following techniques for the cooling quantity from the upper portion of the preform container.

For example, the cooling quantity may be adjusted by supplying cooling air into clearance between the auxiliary heater and the outer wall of the preform container. Another technique is to adjust the cooling quantity by heater moving means for moving the auxiliary heater to change the distance to the preform container. In this case, it is also optional to supply the cooling air into the clearance between the preform container and the auxiliary heater, which is created by movement of the auxiliary heater.

In another technique, the auxiliary heater has a heating element and a heat insulator formed around it and difference to be reduced in the space of clearance to the fiber preform in the semi-Closed space formed by the furnace core tube and the preform container, so as to suppress occurrence of convection described above, even in the case of the elongated fiber preform. Further, the adjustment of the quantity of heat dissipation from the upper portion of the preform container prevents the overheat of the internal wall of the preform container and, in turn, prevents the overheat of the shoulder of the fiber preform, which permits the optical fiber to be surely drawn in steady diameter and which prevents breakage of the drawing furnace.

Here the drawing furnace is preferably one further comprising at least one temperature sensor for measuring an internal temperature of the upper portion of the preform container and adjusting the quantity of heat dissipation, based on the temperature measured by the temperature sensor.

It is preferable to employ either of the following techniques for the adjustment of the quantity of heat dissipation from the upper portion of the preform container.

For example, the quantity of heat radiation may be adjusted by supplying cooling air into clearance between the auxiliary heater and the outer wall of the the cooling quantity is adjusted by moving the heat insulator to change the distance to the preform container. In this case, it is also optional to supply the cooling air into the clearance between the heat insulator and the auxiliary heater, which is created by movement of the heat insulator.

In another technique, the furnace may further comprise a cooling fluid circulation path which is formed around the preform container and in which a cooling fluid flows, and supply means for supplying the cooling fluid into the circulation path. This cooling fluid is preferably air or water.

BEST MODE FOR CARRYING OUT THE INVENTION

Figure 1:
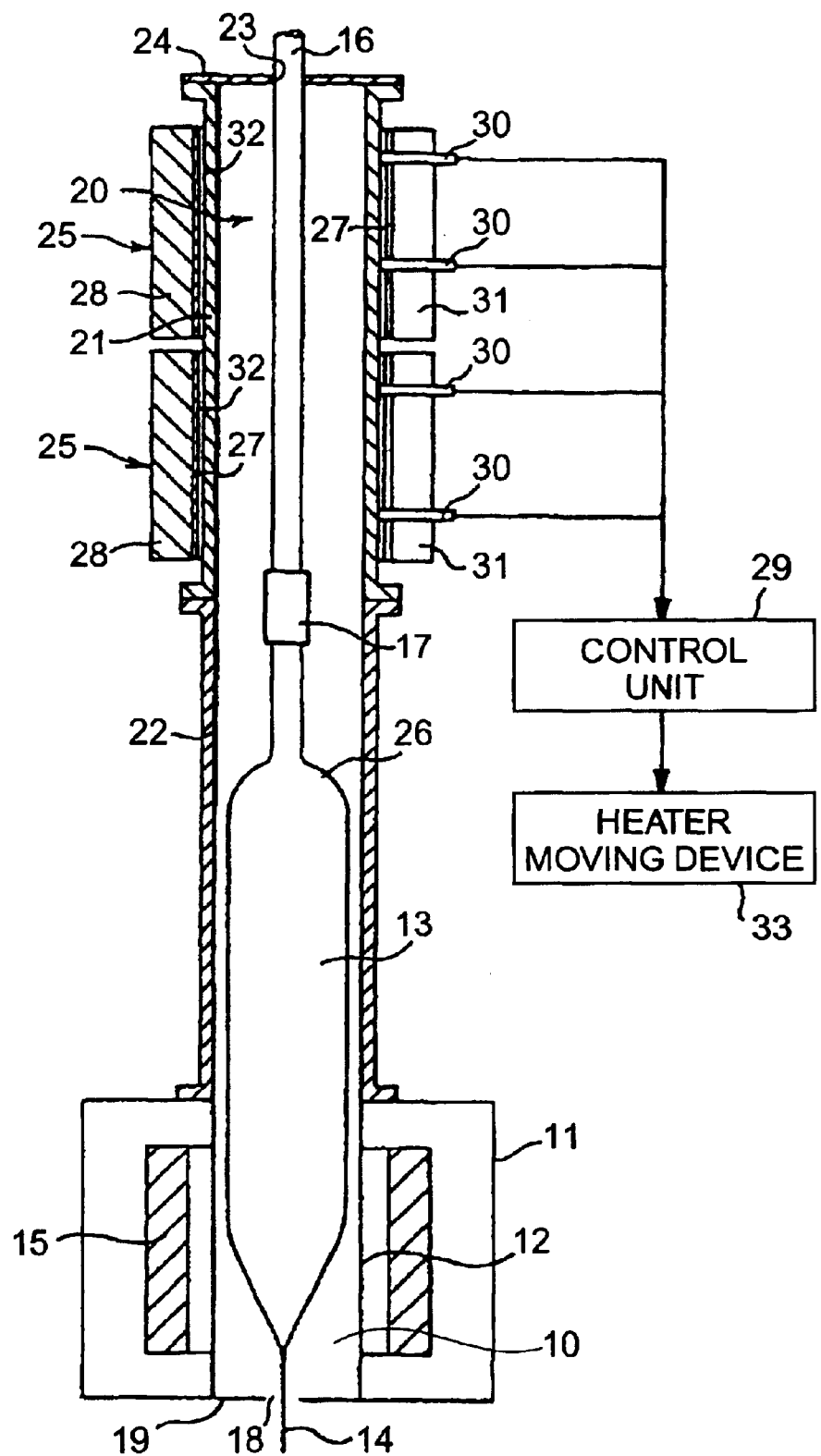
FIG. 1 is a cross-sectional view to show the structure of the first embodiment of the optical fiber drawing furnace according to the present invention.

The preferred embodiments of the present invention will be described hereinafter in detail with reference to the accompanying drawings. To facilitate the comprehension of the explanation, the same reference numerals denote the same parts, where possible, throughout the drawings, and a repeated explanation will be omitted.

Figure 2:
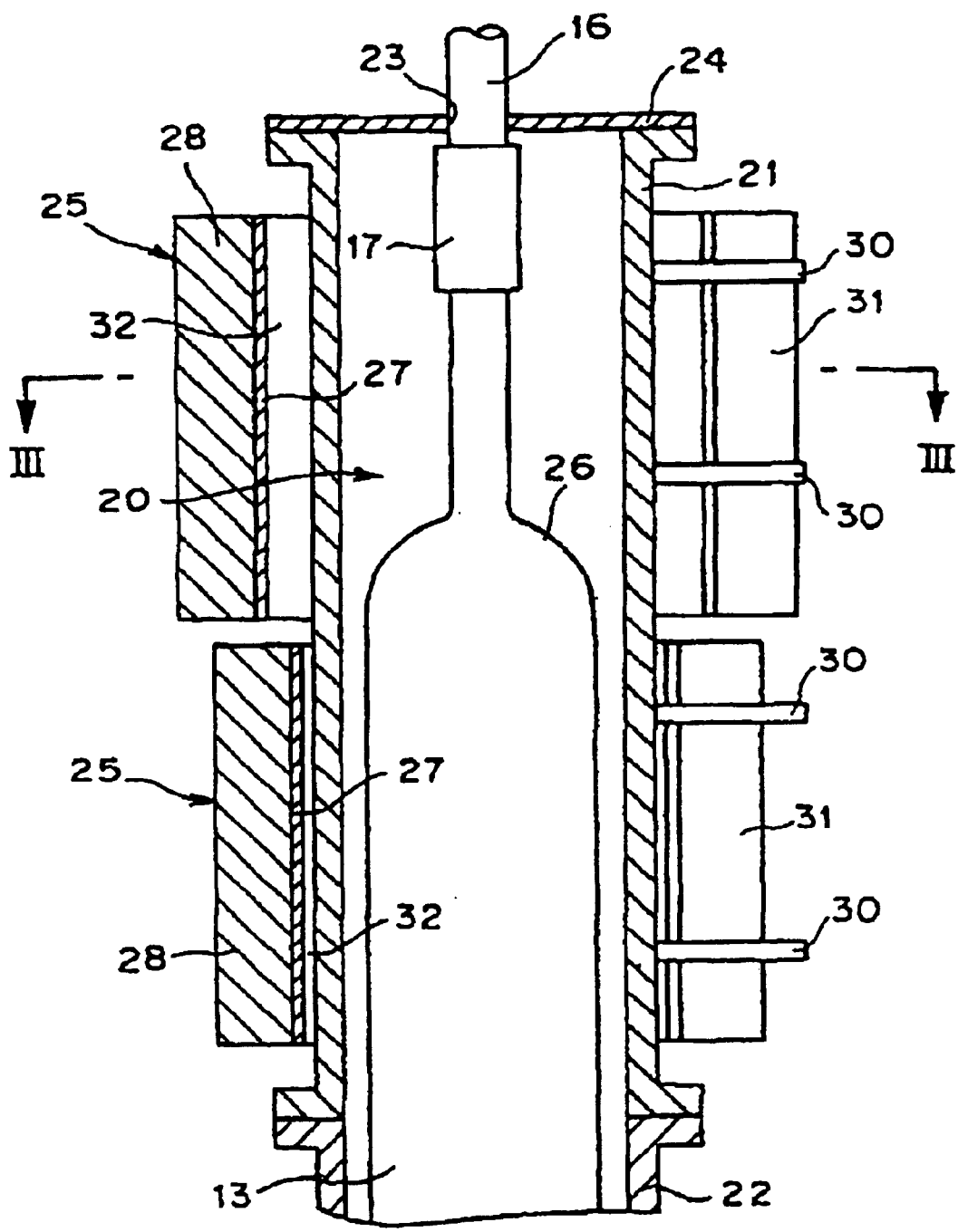
FIG. 2 is an enlarged view to show the major part thereof.
Figure 3:
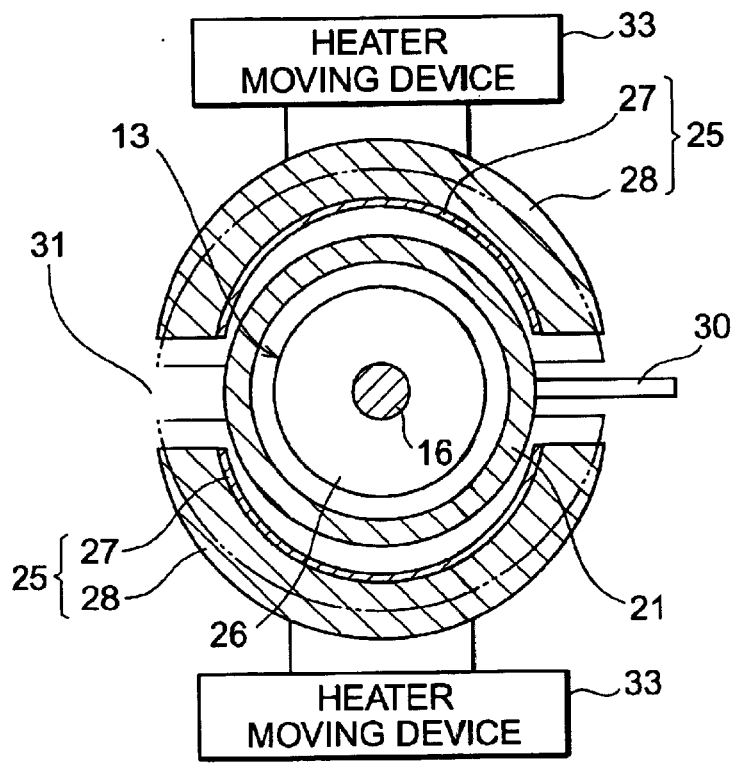
FIG. 3 is a cross-sectional view along a line III—III in FIG. 2.

FIG. 1 is a cross-sectional view to show the structure of the first embodiment of the optical fiber drawing furnace according to the present invention, FIG. 2 an enlarged view to show the major part thereof, and FIG. 3 a cross-sectional view along a line III—III in FIG. 2.

This optical fiber drawing furnace is provided with a furnace body 11 made of stainless steel and lined inside with a heat insulator. A cylindrical furnace core tube 12 is disposed in the central part of this furnace body 11 and an annular carbon heater 15 is placed around it, i.e., between the furnace core tube 12 and the furnace body 11. The furnace core tube 12 and the carbon heater 15 are concentrically arranged. The cylindrical space inside the furnace core tube 12 will be called hereinafter a core chamber 10.

During drawing, a fiber preform 13, an upper end of which is coupled through a joint 17 to a lower end of support rod 16 held by a chuck not shown, is fed from the lower end side thereof along the center axis of the core chamber 10 and an optical fiber 14 is formed by heating and drawing. A seal sheet 19, having a through hole 18 for letting the optical fiber 14 pass in the center, is attached to the lower end of the furnace body 11. When the fiber preform 13 is large, it is preferable to provide a cylindrical furnace core tube extension instead of the seal sheet 19.

A cooling jacket connected to a refrigerant circulator not shown is incorporated in this furnace body 11 and the inside of the core chamber 10 is maintained at a predetermined temperature by controlling supply rates and temperatures of a refrigerant from the refrigerant circulator into the cooling jacket in combination with heating of the carbon heater 15 by a control unit 29 described hereinafter.

Preform container cylinders 21, 22 made of a heat resistant alloy such as inconel or the like are connected to the upper end of the furnace body 11. The internal wall of the furnace core tube 12 is extended to be integrated with the internal walls of the preform containers 21, 22, thereby forming an upper chamber 20. As a result, the furnace core tube 12 and the preform containers 21, 22 form a semi-closeD space (the upper o chamber 20 and core chamber 10) having the aperture 18 at the lower end. Here the preform container part does not always have to be constructed in the structure of FIG. 1, but may also be constructed by connecting three or more cylindrical members in series, or maybe integrally formed.

A shuttering 24, which has an opening 23 of a small diameter for letting the support rod 16 pass so as to be slidable in the center, is attached to the upper end of the preform container 21 to maintain airtightness inside the upper chamber 20. Further, a gas inlet port not shown is provided at the upper end of the preform container 21. A supply of inert gas such as helium or nitrogen is connected through a gas supply tube to the gas inlet port. The inert gas is supplied from this inert gas supply through the gas supply tube and gas inlet port to the upper end of the upper chamber 20 to maintain the inside of the chambers 10 and 20 as the semi-closed space in the inert gas atmosphere.

Around this upper preform container 21, there are auxiliary heaters 25 of an arcuate shape arranged in a vertical two-stage configuration. Each of these auxiliary heaters 25 has an iron-chromium-aluminum-based heating wire 27 and a heat insulator 28 of ceramic fiber surrounding this heating wire to hold it. Two halves of each heater are arranged in symmetry with the preform container 21 in between and clearance 31 is formed between them, as shown in FIG. 3. A plurality of temperature sensors 30 for measuring the temperature of the wall of the preform container 21 are placed in this part of clearance 31.

Then each of the heating wires 27 is connected to the control unit 29 for controlling power supply states to them. Each of the temperature sensors 30 described above is connected to this control unit 29 to send each control information thereto.

The auxiliary heaters 25 are connected to a heater moving device 33, and by actuating this heater moving device 33, the distance between the auxiliary heaters 25 and the preform container 21 can be adjusted between a heating position shown by chain double-dashed lines and a dissipating position shown by solid lines in FIG. 3.

Figure 4:
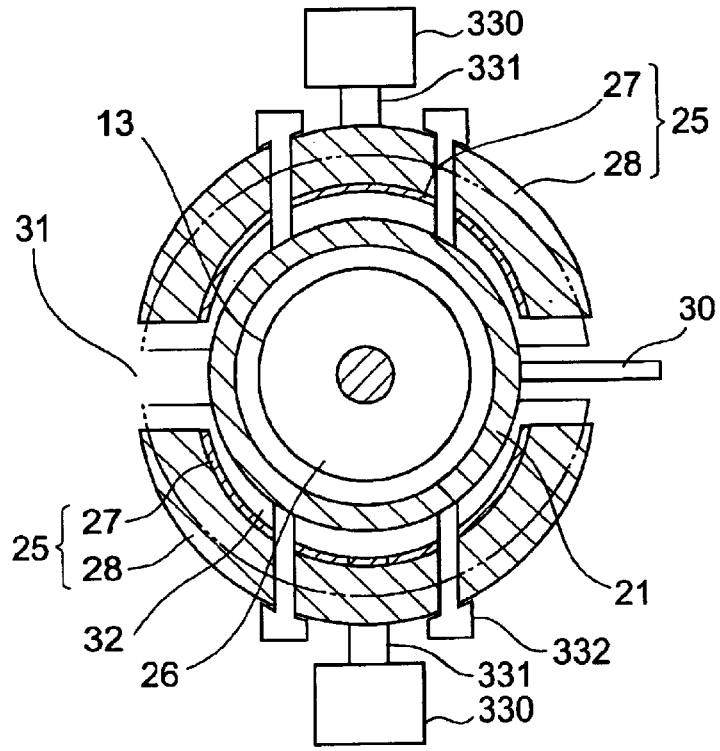
FIG. 4 is a drawing to show an example of a heater moving device.

FIG. 4.is a view to show an example of this heater moving device. The auxiliary heater 25 is mounted so as to be movable on rails 332 attached to the preform container 21. Then motors 330 are driven to move the auxiliary heater 25 toward or away from the preform container 21 through shafts 331 attached to the auxiliary heater 25. The auxiliary heater 25 can be translationally moved by using linear motors as the motors 330 or by placing rack-and-pinion gears between the motors 330 and the shafts 331.

Next described in detail is the operation of the present embodiment, i.e., the drawing method of optical fiber according to the present invention.

The upper end of the fiber preform 13 is coupled through the joint 17 to the lower end of the support rod 16. Then this support rod 16 is held by the chuck not shown, whereby the fiber preform 13 is set in the upper chamber 20, i.e., inside the preform containers 21, 22. Then the shuttering 24 is attached so as to allow the support rod 16 to slide in the aperture 23.

In this state the inert gas is supplied from the inert gas supply source not shown through the gas supply tube and gas inlet port into the upper chamber 20 to fill the inside of the thus-created semi-closed space with the inert gas atmosphere.

After that, the fiber preform 13 is fed from the lower end thereof into the core chamber 10. The fiber preform 13 is heated in the core chamber 10 by the carbon heater 15 to melt and soften and then fiber drawing is carried out to make the optical fiber 14.

In the initial stage of drawing (see FIG. 2) in which the fiber preform 13 is sufficiently long and in which the shoulder 26 with diameters gradually decreasing at the upper end is located inside the upper preform container 21, the volume of space is small above this shoulder 26 in the upper chamber 20, so that great thermal convection is unlikely to occur.

However, if the drawing should be carried out simply, the following problem would arise. The heat radiation from the carbon heater 15 is incident on the lower end of the fiber preform 13, passes through the cylindrical body thereof, and radiates from the shoulder 26. This causes increase in the temperature of the internal wall of the preform container 21 and could melt the preform container 21 in the worst case. Even if the melting of the preform container 21 is not encountered, the fiber preform 13 could soften in the shoulder 26 because of the increase in the temperature of the shoulder 26 and be extended by the dead weight thereof. It can result in great diameter fluctuations of the optical fiber 14 and the fiber preform 13 itself can break at the shoulder 26 to drop in the worst case.

This phenomenon can occur when the temperature in the upper part of the preform container 21 exceeds 800° C. In the present embodiment, therefore, the control unit 29 monitors the temperature of the preform container 21 by the temperature sensors 30. When the temperature measured exceeds a predetermined temperature, the control unit 29 actuates the heater moving device 33 to move the auxiliary heaters 25 away from the preform container 21 as shown by the solid lines in FIG. 3. This creates the clearance 32 of about 4 to 5 cm between the external wall of the preform container 21 and the auxiliary heaters 25 to promote dissipation of heat from the external wall of the preform container 21 to the outside air passing this clearance 32, thereby cooling the preform container 21 and preventing the overheat thereof.

A necessary condition is that the temperature of the preform container 21 is controlled not more than 800° C., as described above, but it is preferable to control the temperature not more than 700° C. in terms of assurance of lifetime for the drawing furnace and stability of fabrication of the optical fiber 14. In this case, preferably, the control unit 29 cuts off the power supply to the auxiliary heaters 25 to bring them into a non-heating state.

The fiber preform 13 descends in the upper chamber 20 with progress of drawing and the shoulder 26 also descends. This results in increase in the volume of the space above the shoulder 26 in the upper chamber 20. When the volume of the space in this portion increases considerably, the temperature of the gas decreases in the upper part in this space. Then thermal convection can occur from the heat source of the shoulder 26 in the space above the shoulder 26 of the fiber preform 13. This thermal convection becomes conspicuous when the temperature of the preform container 21 becomes less than 300° C.

In the present embodiment, as described previously, the control unit 29 monitors the temperature of the preform container 21 by the temperature sensors 30. When the measured temperature becomes lower than a predetermined temperature, the control unit 29 actuates the heater moving device 33 to move the auxiliary heaters 25 before they abut on the outer wall of the preform container 21 as shown by the chain double-dashed lines in FIG. 3. Then the auxiliary heaters 25 are activated to heat the preform container 21 and thereby heat the atmosphere in the upper chamber 20, thereby preventing the aforementioned occurrence of thermal convection.

The temperature of the preform container 21 at this time needs to be adjusted to not less than 300° C. and it is preferable to adjust the temperature to not less than 400° C.

By adjusting the quantity of heat dissipation from the outer wall of the preform container 21 in this way, the present embodiment can finely adjust the temperature of the preform container 21 and, in turn, the temperature of the atmosphere in the upper chamber 20 inside thereof and thus prevent the occurrence of thermal convection and the overheat of the preform container 21 and the shoulder 26 of the fiber preform 13. As a consequence, the drawing of the optical fiber 14 can be carried out on a stable basis.

Figure 5:
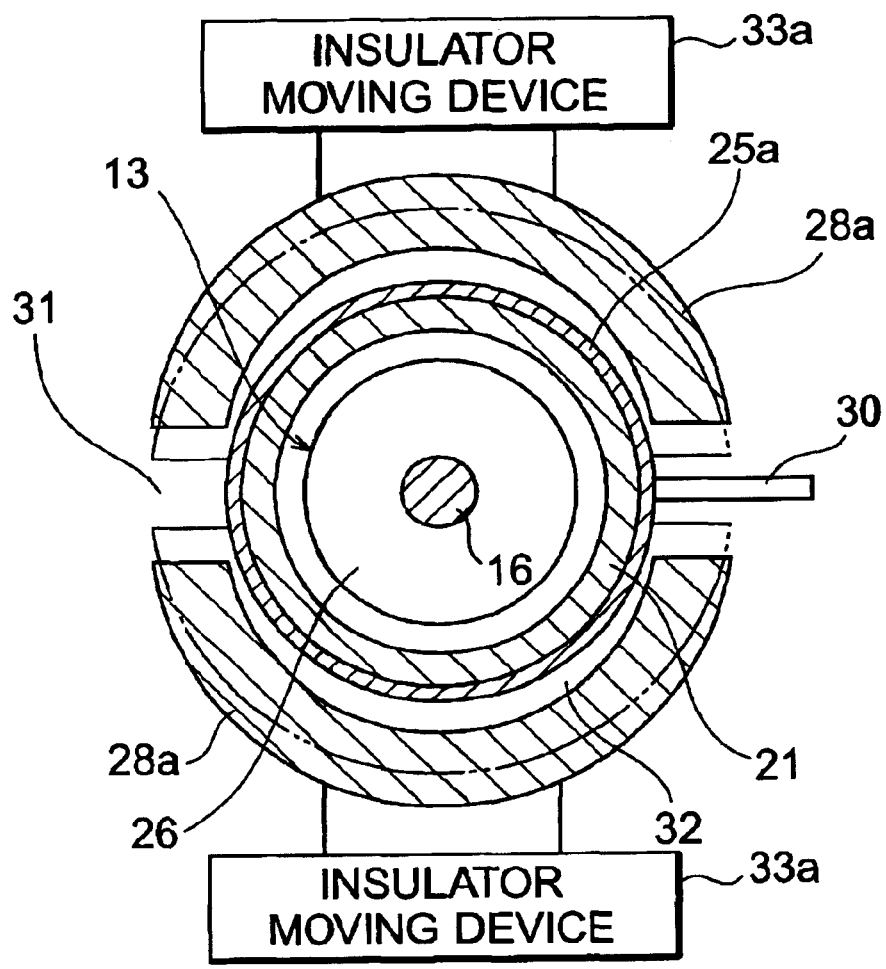
FIG. 5 to FIG. 8 are cross-sectional views each showing the upper preform container part and the heater moving device in other embodiments of the optical fiber drawing furnace according to the present invention.

FIG. 5 is a cross-sectional view of the upper preform container part in the second embodiment of the fiber drawing furnace according to the present invention. In the present embodiment the auxiliary heater 25a is constructed by attaching a heating wire coated with an electric insulator and a heat resistant alloy, to the outer wall of the preform container 21. Only heat insulators 28a are arranged movable by an insulator moving device 33a. This insulator moving device 33a is a device similar to the heater moving device 33 in the first embodiment (see FIG. 3).

In the present embodiment, the clearance 32 between the heat insulators 28a and the auxiliary heater 25a is adjusted by moving the heat insulators 28a between the heating position shown by chain double-dashed lines and the dissipating position shown by solid lines, by the insulator moving device 33a. This implements adjustment of heat dissipation from the external wall of the auxiliary heater 25a, so as to be able to adjust the quantity of heat dissipation from the preform container 21, whereby the drawing of the optical fiber 14 can be performed on a stable basis.

In these embodiments, each of the auxiliary heaters 25 or the heat insulators 28a has the cross-sectional shape of semicircular arches formed by dividing a cylinder into two parts. However, the shape of the auxiliary heaters 25 or the heat insulators 28a is not limited to this, but they may be formed in the shape obtained by dividing a cylinder into three or more parts in the circumferential direction. Another applicable configuration is a C-shaped sectional structure obtained by cutting out part of a side face of a cylinder along the longitudinal direction thereof, and the clearance 32 to the preform container 21 is expanded by elastic deformation of the cylinder while widening the width of this cut part.

Figure 6:
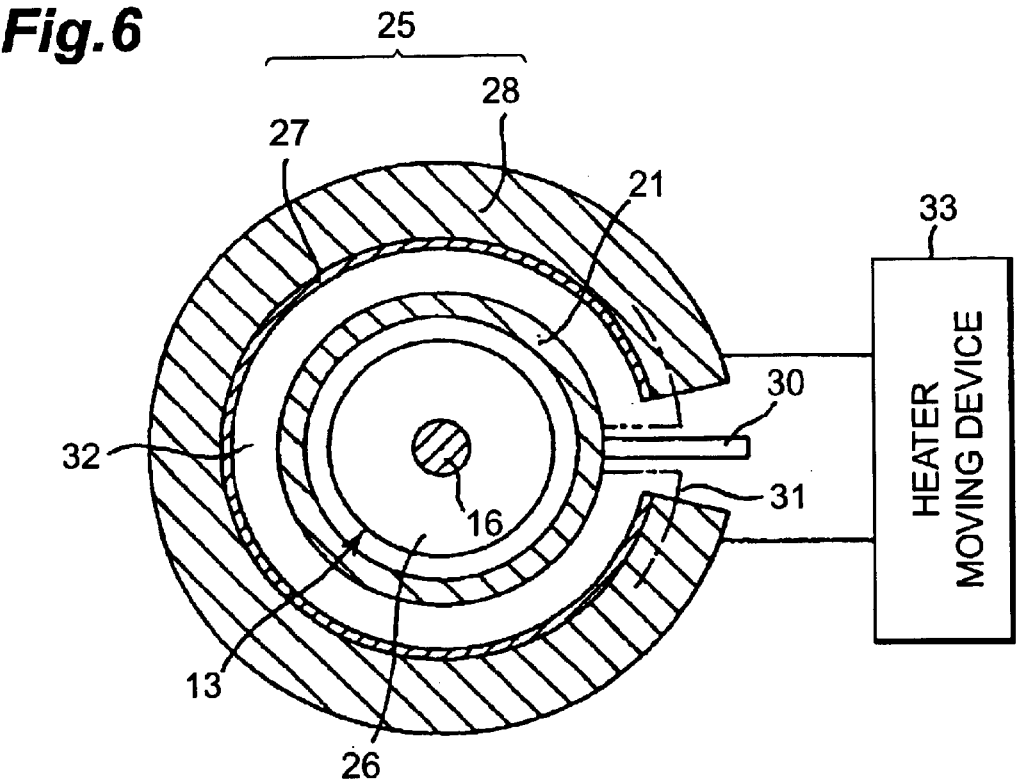

FIG. 6 is a cross-sectional view of the upper preform container 21 in the fiber drawing furnace of the third embodiment having the auxiliary heater 25 of this type. Namely, the auxiliary heater 25 in the present embodiment has the approximately cylindrical shape of the C-shaped sectional structure. Then the width of the clearance 31 of the cut part is expanded by driving the heater moving device 33. This causes the elastic deformation of the auxiliary heater 25 and moves the heater from the heating position shown by chain double-dashed lines to the dissipating position shown by solid lines, thereby expanding the clearance 32 between the preform container 21 and the auxiliary heater. The quantity of heat dissipation from the preform container 21 is adjusted in the same manner as in the first and second embodiments by adjusting this clearance 32, whereby the drawing of the optical fiber 14 can be performed on a stable basis.

Figure 7:
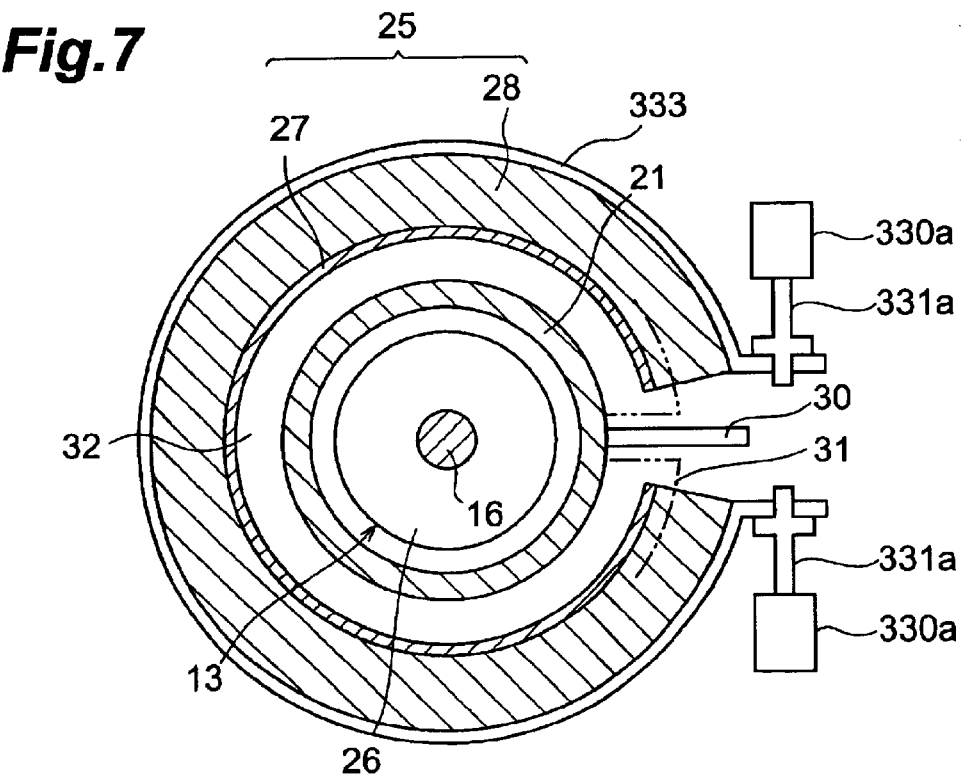

FIG. 7 is a diagram to show a specific example of the heater moving device 33 in this embodiment. A belt 333 is wrapped around the auxiliary heater 25 and the clearance 32 between the preform container 21 and the auxiliary heater 25 is adjusted by controlling the distance of the cut part of this belt 333 by motors 330a and shafts 331a.

Figure 8:
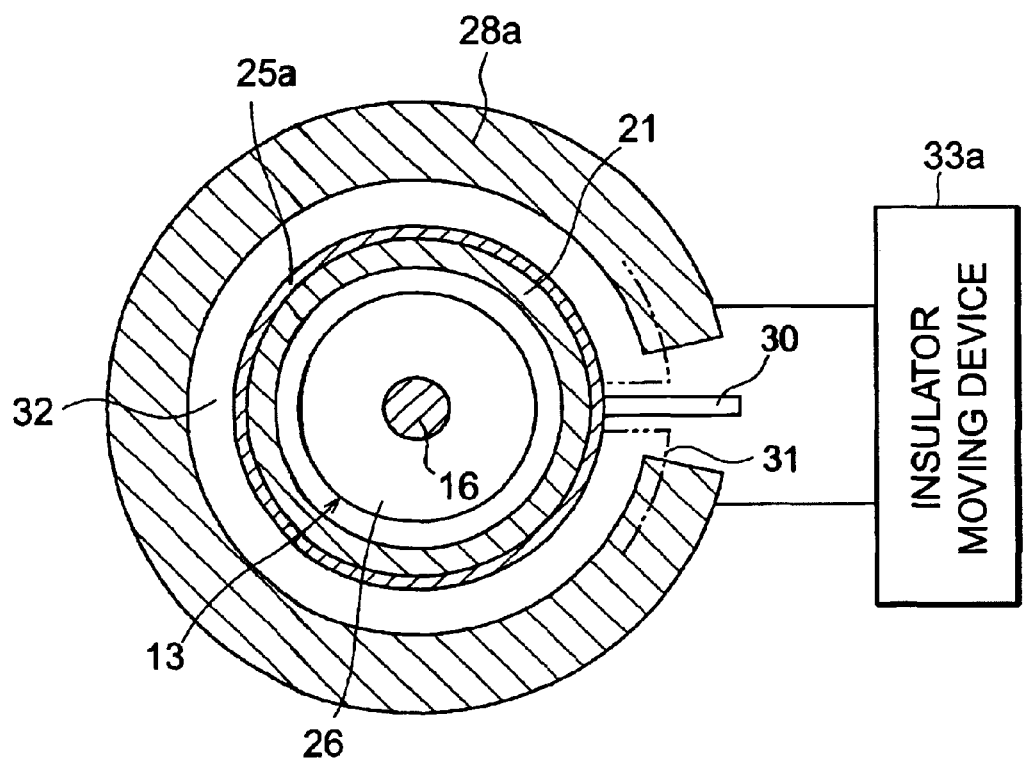

FIG. 8 is a cross-sectional view of the upper preform container part in the fourth embodiment of the fiber drawing furnace according to the present invention. In the present embodiment the auxiliary heater 25a is constructed by attaching a heating wire coated with an electric insulator and a heat resistant alloy, to the external wall of the preform container 21 in the same manner as in the second embodiment. Only a heat insulator 28a having the C-shaped cross section similar to that in the third embodiment is arranged movable by the insulator moving device 33a. This insulator moving device 33a is a device similar to that in the second embodiment.

In the present embodiment the clearance 32 between the insulator 28a and the auxiliary heater 25a is also adjusted by expanding the clearance 31 in the cut part of the insulator 28a by the insulator moving device 33a. This permits the quantity of heat dissipation from the preform container 21 to be adjusted by controlling the dissipation from the external wall of the auxiliary heater 25a, whereby the drawing of the optical fiber 14 can be performed on a stable basis.

Figure 9:
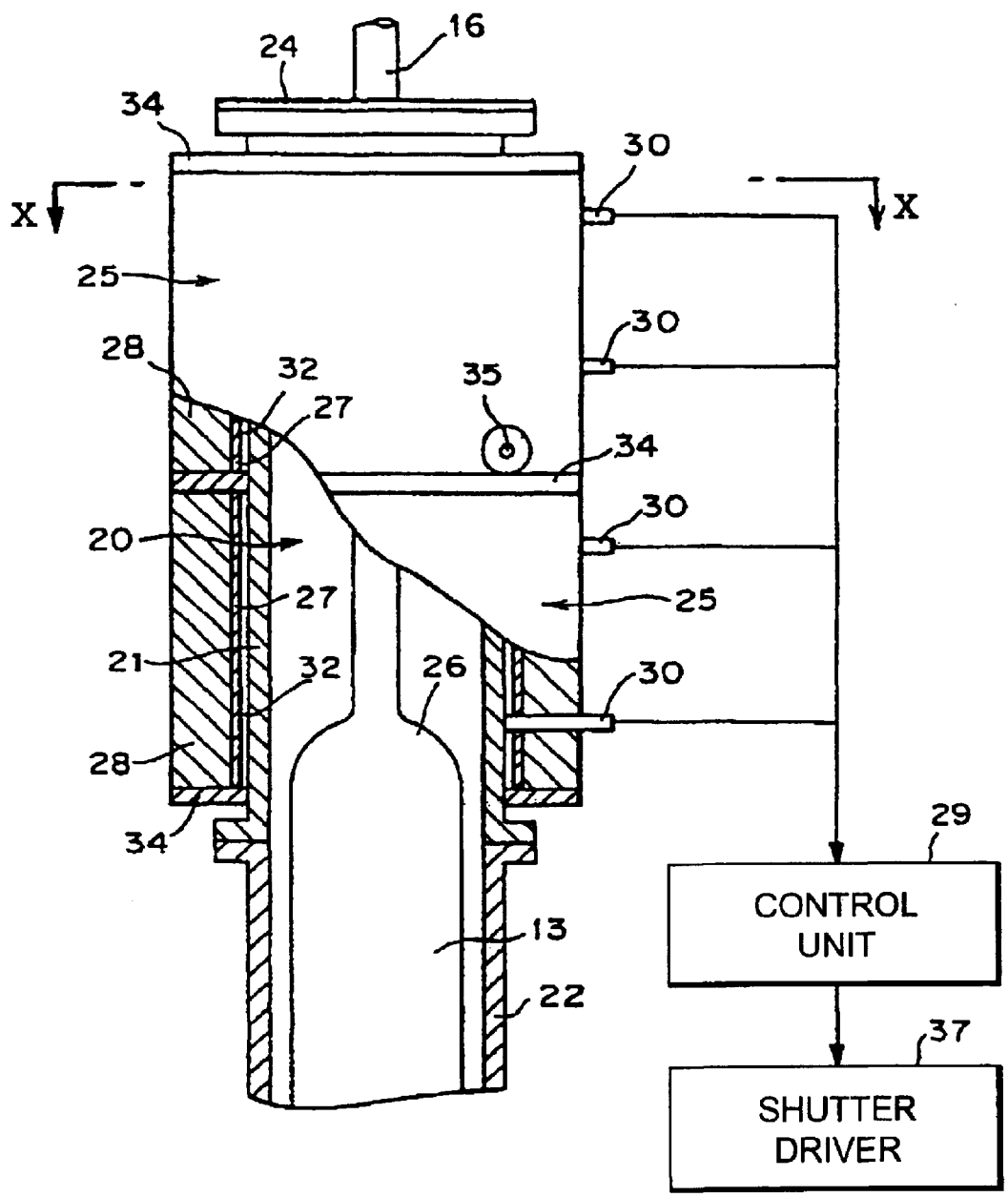
FIG. 9 is a cutaway view to show the structure of the major part of the fifth embodiment of the optical fiber drawing furnace according to the present invention.
Figure 10:
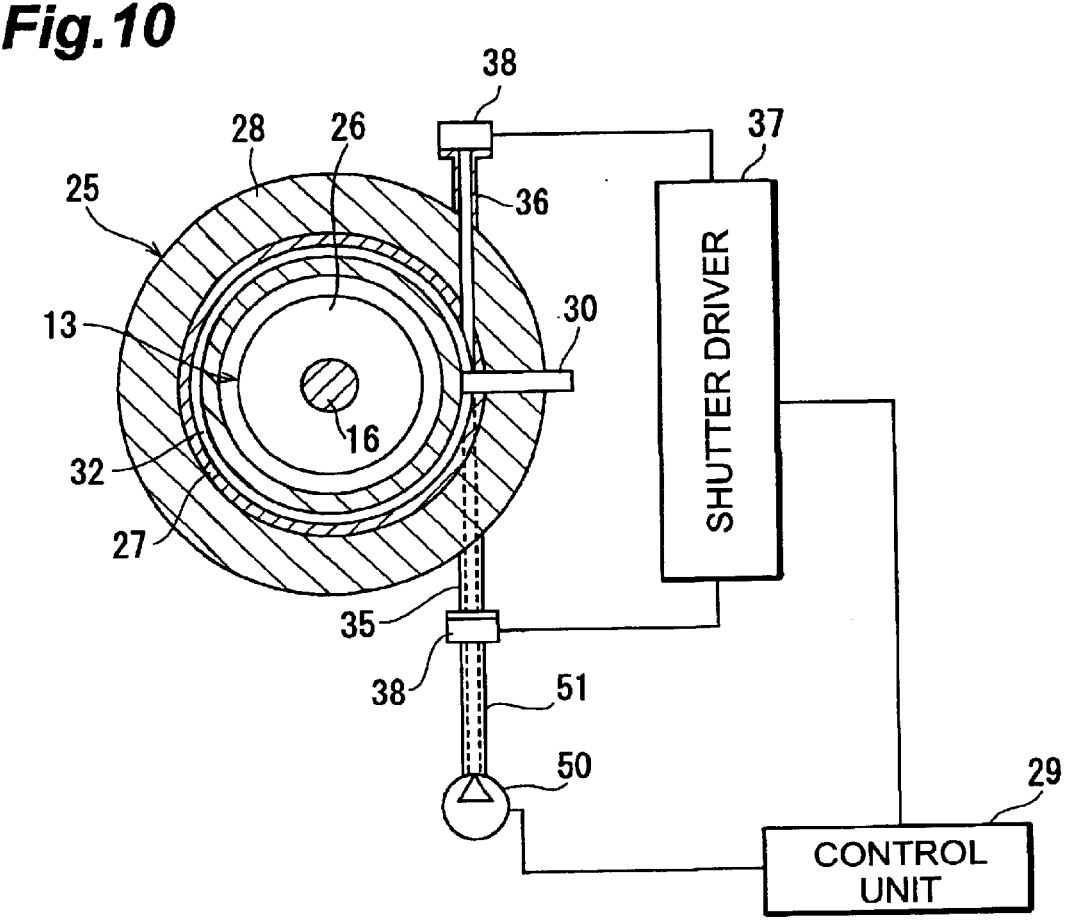
FIG. 10 is a cross-sectional view along a line X—X of FIG. 9.

These first to fourth embodiments all are arranged to adjust the heat dissipation from the external wall of the preform container 21 by natural air cooling, but it is also possible to make use of forced cooling. FIG. 9 and FIG. 10 respectively present a cutaway structural view and a cross-sectional view along a line X—X of the major part of the fifth embodiment of the fiber drawing furnace of the present invention making use of the forced cooling.

In the present embodiment the auxiliary heater 25 is of a cylindrical form, different from the auxiliary heaters 25 in the first and third embodiments. The clearance 32 of about 5 cm is formed between the heater and the preform container 21, also different from the auxiliary heaters 25a in the second and fourth embodiments. Annular heat insulators 34 are placed in close fit with the preform container 21 at the upper and lower ends, respectively, of the auxiliary heater 25, so as to seal the clearance 32. Since the present embodiment employs the structure in which the heating wire 27 of the auxiliary heater 25 is exposed to the clearance 32, it is preferable to use a nickel-chromium-based or iron-chromium-based heating body with excellent oxidation resistance.

The auxiliary heater 25 is equipped with an inlet tube 35 penetrating the heater from the outside thereof into the internal clearance 32 and an exhaust tube 36 penetrating the heater from the internal clearance 32 to the outside thereof. Shutters 38, which can be controlled to be opened or closed simultaneously, are disposed at respective opening ends of the inlet tube 35 and the exhaust tube 36 outside the cylinder and their open/close positions are controlled by a shutter driving device 37 actuated by the control unit 29. An air-providing pump 50 is further connected through a supply tube 51 to the inlet tube 35 so as to be able to blow air into the clearance 32.

During the fiber drawing operation of the optical fiber by use of the present embodiment, the control unit 29 monitors the temperature of the preform container 21 by the temperature sensors 30 in the same manner as in the other embodiments. When the temperature of the preform container 21 is about to become not less then 700° C., the power supply is terminated to the auxiliary heater 25 (heating wire 27), the shutters 38 are opened, and the air-providing pump, 50 is actuated to supply the cooling air of as large as 5 m$^3$ per minutes through the supply tube 51 and inlet tube 35 into the clearance 32. The blowing air forcedly cools the preform container 21 from the outside, so that the temperature of the preform container 21 is maintained not more than the predetermined temperature. As a result, the hot air is discharged through the exhaust tube 36 into the atmosphere.

On the other hand, when the temperature of the preform container 21 is about to become not more than 400° C., the air-providing pump 50 is stopped and the shutters 38 are closed, so as to keep the clearance 32 perfectly in a hermetic state. Then the power is supplied to the auxiliary heater 25 (heating wire 27), to heat the preform container 21 from the external wall.

In the present embodiment, as shown in FIG. 10, the cooling air is supplied from the tangential direction into the clearance 32 to make a turning flow in the clearance 32, thereby enhancing the heat dissipation effect from the outside wall of the preform container 21. Besides it, it is also possible to accomplish the same effect by partitioning the inside of the clearance 32 in spiral structure.

Figure 11:
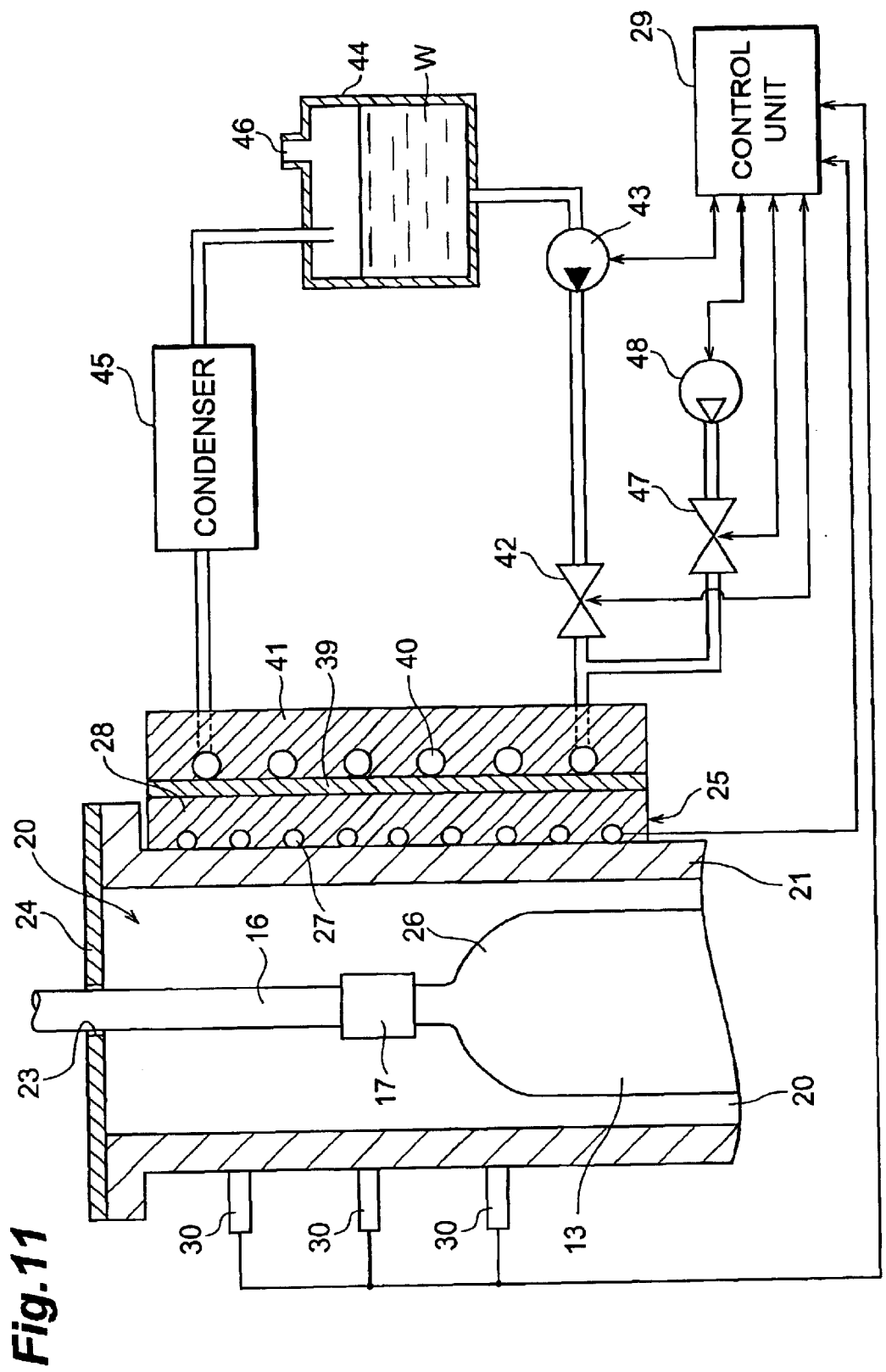
FIG. 11 is a view to show the structure of the major part of the sixth embodiment of the optical fiber drawing furnace according to the present invention.

The cooling fluid for the forced cooling can also be either of liquids such as water, oil, and the like, as well as the air. FIG. 11 is a view to show the schematic structure of the major part of the sixth embodiment of the fiber drawing furnace of the present invention employing this liquid cooling method.

In the present embodiment a heat-transfer plate 39 made of stainless steel or the like is attached to the periphery of the auxiliary heater 25. A tube is further wrapped around this heat-transfer plate 39 to form a cooling coil 40 and a heat insulator 41 is placed so as to surround it.

One end of the cooling coil 40 is connected through a flow control valve 42 and a pump 43 to a water tank 44, and the other end is connected through a condenser 45 to this water tank 44, thus forming a circulation path. Cooling water W is reserved in this water tank 44 and an air vent 46 is provided at the upper end of the water tank 44. An air pump 48 is connected through a switching valve 47 to between the cooling coil 40 and the flow control valve 42. The control unit 29 controls opening/closing of these flow control valve 42 and switching valve 47 and the operation of the pumps 43, 48.

During the fiber drawing operation of the optical fiber in the present embodiment, the control unit 29 monitors the temperature measured by the temperature sensors 30. When the temperature of the preform container 21 increases to raise the necessity of heat dissipation, the control unit 29 closes the switching valve 47, activates the pump 43, and controls the flow regulator valve 42 to let the cooling water W flow at a predetermined flow rate in the cooling coil 40, thereby forcedly cooling the preform container 21 and promoting heat dissipation from the upper chamber 20.

The cooling water W heated to evaporate during the cooling of the preform container 21 is condensed by the condenser 45 and then returned to the water tank 44. Even if the returned cooling water W at the high temperature increases the temperature of the water inside the water tank 44, vapor will be discharged through the air vent 46 whereby the pressure inside the water tank 44 is maintained at the atmospheric pressure.

When the temperature of the preform container 21 becomes too low on the other hand, the control unit 29 stops the operation of the pump 42, closes the flow control valve 42, opens the switching valve 47, and activates the air pump 47 to force air into the cooling coil 40, thereby discharging the cooling water W remaining in the cooling coil 40 toward the condenser 45. After that, the control unit stops the air pump 47 and closes the switching valve 47 to keep the inside of the cooling coil 40 in a hermetic state. Then the control unit energizes the heating wire 27 to heat the preform container 21 from the outside, so as to maintain the temperature not less than the predetermined temperature.

This embodiment described the example in which the cooling coil 40 was disposed outside the auxiliary 251 heater 25, but the cooling coil 40 may be disposed inside the heat insulator 28 of the auxiliary heater 25.

The inventors actually conducted the fiber drawing from the long fiber preform 13 (having the length of 1.8 m and the diameter of 9 cm) with adjusting the temperature of the preform container 21 in the range of 400 to 700° C., using these fiber drawing furnaces. It was verified from the result of the fiber drawing that the optical fiber 14 was able to be produced with less diameter fluctuations, i.e., in the diameter of 125 μm ±0.1 μm throughout the entire length (900 km).

Industrial Applicability

The fiber drawing furnaces and fiber drawing method according to the present invention are suitably applicable to stable fabrication of the optical fiber with less diameter fluctuations, particularly, by use of the long fiber preform.

What is claimed is:

1. An optical fiber drawing method comprising steps of setting an optical fiber preform in a furnace core tube and a preform container connected to an upper portion of the furnace core tube and drawing an optical fiber from one end of said preform by heating and softening, wherein:

an upper portion of said preform container is provided with an auxiliary heater and cooling means for cooling said upper portion of said preform container and said drawing step includes adjusting a cooling quantity by said cooling means; and said auxiliary heater is disposed movable relative to an outer wall of said preform container and said adjustment of the cooling quantity by said cooling means includes adjustment of a distance between the outer wall of said preform container and said auxiliary heater.

2. An optical fiber drawing method comprising steps of setting an optical fiber preform in a furnace core tube and a preform container connected to an upper portion of the furnace core tube and drawing an optical fiber from one end of said preform by heating and softening, wherein:

an upper portion of said preform container is provided with an auxiliary heater and cooling means for cooling said upper portion of said preform container, and said drawing step includes adjusting a cooling quantity by said cooling means; and said auxiliary heater is placed on an outer wall of said preform container, a heat insulator is disposed movable around the auxiliary heater, and said adjustment of the cooling quantity by said cooling means includes adjustment of a distance between the outer wall of said preform container and said heat insulator.

3. An optical fiber drawing furnace comprising a furnace core tube through which a fiber preform penetrates vertically, a heater disposed around said furnace core tube, and a preform container connected to an upper portion of said furnace core tube so as to be integral with said furnace core tube to form a semi-closed space opening in part at a lower end, for housing said fiber preform inside, said fiber drawing furnace further comprising:

an auxiliary heater disposed at an upper portion of said preform container;

cooling means for cooling the upper portion of said preform container; and at least one temperature sensor for measuring an internal temperature in the upper portion of said preform container, wherein said cooling means includes a control unit for adjusting the cooling quantity, based on the temperature measured by said temperature sensor, wherein said cooling means is air-providing means for supplying cooling air into clearance between said auxiliary heater and an outer wall of said preform container.

4. An optical fiber drawing furnace comprising a furnace core tube through which a fiber preform penetrates vertically, a heater disposed around said furnace core tube, and a preform container connected to an upper portion of said furnace core tube so as to be integral with said furnace core tube to form a semi-closed space opening in part at a lower end, for housing said fiber preform inside, said fiber drawing furnace further comprising:

an auxiliary heater disposed at an upper portion of said preform container;

cooling means for cooling the upper portion of said preform container; and at least one temperature sensor for measuring an internal temperature in the upper portion of said preform container, wherein said cooling means includes a control unit for adjusting the cooling quantity, based on the temperature measured by said temperature sensor, wherein said cooling means comprises heater moving means for moving said auxiliary heater to change a distance relative to said preform container.

5. An optical fiber drawing furnace according to claim 4, further comprising air-providing means for supplying cooling air into clearance between said preform container and said auxiliary heater, created by movement of said auxiliary heater.

6. An optical fiber drawing furnace comprising a furnace core tube through which a fiber preform penetrates vertically, a heater disposed around said furnace core tube and a preform container connected to an upper portion of said furnace core tube so as to be integral with said furnace core tube to form a semi-closed space opening in part at a lower end, for housing said fiber preform inside, said fiber drawing furnace further comprising:

an auxiliary heater disposed at an upper portion of said preform container;

cooling means for cooling the upper portion of said preform container; and at least one temperature sensor for measuring an internal temperature in the upper portion of said preform container, wherein said cooling means includes a control unit for adjusting the cooling quantity, based on the temperature measured by said temperature sensor, wherein said auxiliary heater comprises a heating element and a heat insulator formed around the heating element, said cooling means is insulator moving means for moving said heat insulator to change a distance relative to said preform container.

7. An optical fiber drawing furnace according to claim 6, further comprising air-providing means for supplying cooling air into clearance between said heat insulator and said auxiliary heater, created by movement of said heat insulator.

* * * * *